United States Patent
Brailovskiy et al.

(10) Patent No.: US 10,586,351 B1
(45) Date of Patent: Mar. 10, 2020

(54) AMBIENT LIGHT ESTIMATION FOR CAMERA DEVICE IN INFRARED CHANNEL

(71) Applicant: Amazon Technologies, Inc., Seattle, WA (US)

(72) Inventors: Ilya Vladimirovich Brailovskiy, Mountain View, CA (US); Isabella Talley Lewis, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 247 days.

(21) Appl. No.: 15/628,044

(22) Filed: Jun. 20, 2017

(51) Int. Cl.
| | |
|---|---|
| G06T 7/80 | (2017.01) |
| H04N 5/232 | (2006.01) |
| G02B 5/28 | (2006.01) |
| H04N 5/33 | (2006.01) |

(52) U.S. Cl.
CPC ............ G06T 7/80 (2017.01); H04N 5/23245 (2013.01); G02B 5/281 (2013.01); G06T 2207/10048 (2013.01); H04N 5/33 (2013.01)

(58) Field of Classification Search
CPC ....... G06T 7/80; H04N 5/23245; G02B 5/281
See application file for complete search history.

(56) References Cited

U.S. PATENT DOCUMENTS

| | | | |
|---|---|---|---|
| 9,491,440 | B2 | 11/2016 | Atkinson |
| 9,570,491 | B2 | 2/2017 | Li et al. |
| 2015/0373278 | A1* | 12/2015 | Hattori .................. H04N 5/332 348/148 |
| 2016/0117554 | A1* | 4/2016 | Kang .................. H04N 13/366 348/78 |
| 2017/0078591 | A1 | 3/2017 | Petrov et al. |
| 2019/0068929 | A1* | 2/2019 | Sato ..................... H04N 9/0451 |

OTHER PUBLICATIONS

Eigen et al.; Predicting Depth, Surface Normals and Semantic Labels with a Common Multi-Scale Convolutional Architecture; 9 pgs; 2015.

* cited by examiner

Primary Examiner — Jamie J Atala
Assistant Examiner — Hesham K Abouzahra
(74) Attorney, Agent, or Firm — K&L Gates LLP

(57) ABSTRACT

Devices and techniques are generally described for estimation of ambient light levels. In various examples, an image sensor may capture a frame of image data. In some examples, an ambient light value of the frame may be determined. In some examples, a first region of the frame corresponding to a first physical characteristic and a second region of the frame corresponding to a second physical characteristic may be determined. In various examples, a first reflection coefficient associated with the first physical characteristic and a second reflection coefficient associated with the second physical characteristic may be determined. In some examples, an IR correction value may be determined for the frame of image data based at least in part on the first reflection coefficient and the second reflection coefficient. An estimated ambient light value may be determined based at least in part on the IR correction value and the ambient light value.

20 Claims, 6 Drawing Sheets

AMBIENT LIGHT ESTIMATION FOR CAMERA DEVICE IN INFRARED CHANNEL

BACKGROUND

Cameras and other image sensors may be used to capture images and/or videos of a physical environment. Some cameras include image sensors effective to detect light in both the visible and infrared (IR) spectrums. Such cameras often include day and night modes. In day mode, such cameras use an infrared cut filter to filter out light in the infrared spectrum in order to reproduce color image data. In night mode the IR cut filter is removed from the light path allowing IR illumination to reach the image sensor in order to produce image data.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for capturing and/or displaying image content. Image data, as described herein, may refer to stand-alone frames of image data or to multiple frames of sequential image data, appended together to form a video. Frames of image data may be comprised of a plurality of pixels arranged in a two-dimensional grid including an x component representing a horizontal direction in the grid and a y component representing a vertical direction in the grid. A pixel may be the smallest addressable unit of image data in a frame. A particular pixel may be identified by an x value, representing the horizontal position of the pixel in the two-dimensional grid and a y value, representing the vertical position of the pixel in the two-dimensional grid.

Figure 1:
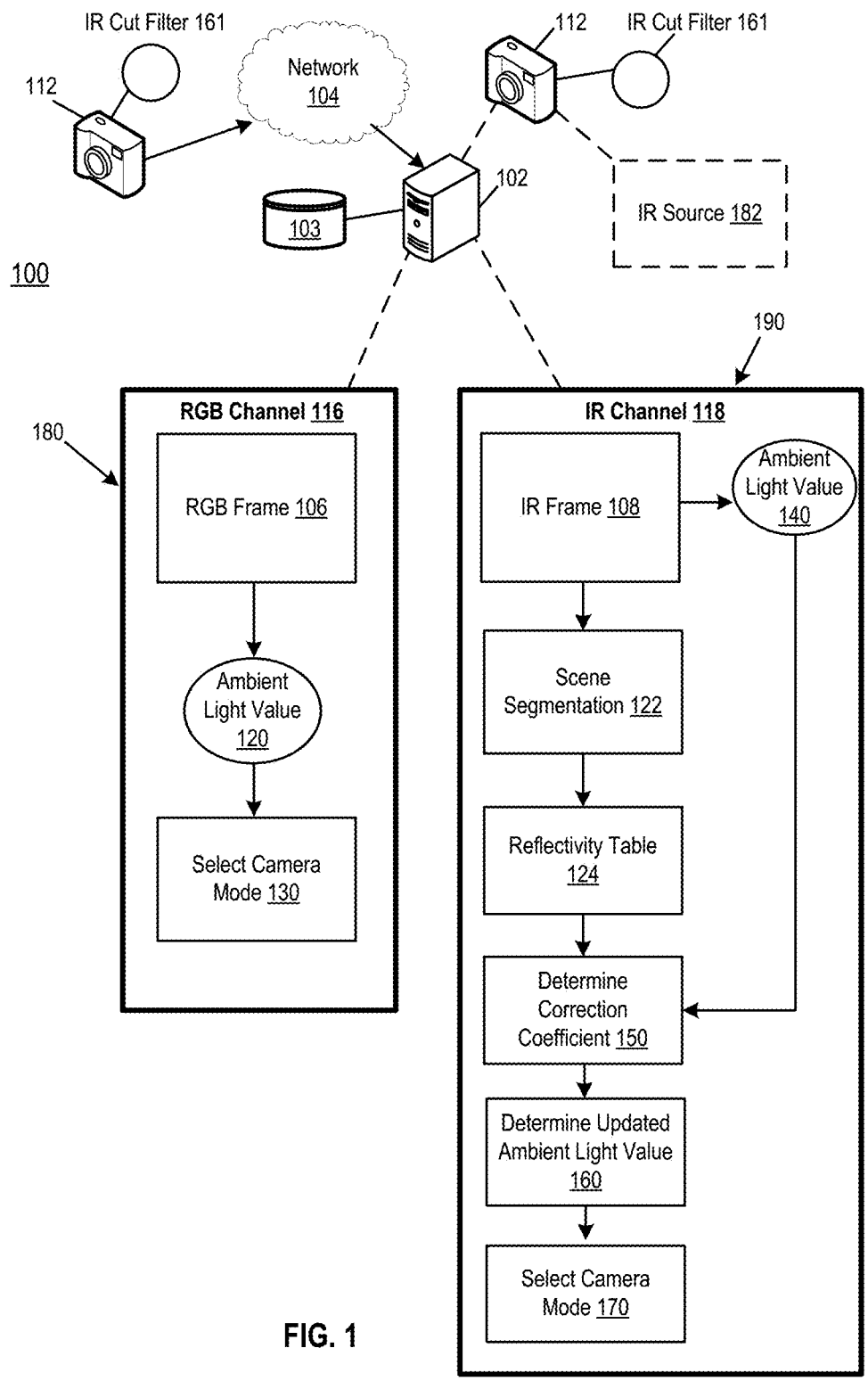
FIG. 1 is a system diagram showing an example system effective to estimate ambient light in the IR channel, arranged in accordance with various aspects of the present disclosure.

FIG. 1 is a diagram showing an example system 100, arranged in accordance with various aspects of the present disclosure. The system 100 comprises image capture device 112, one or more processors 102, and memory 103. In various examples, one or more of the image processing techniques described herein may be performed by a processor included within a housing of image capture device 112. In other examples, one or more of the image processing techniques described herein may be performed by a computing device accessible via a communications network, such as network 104. Accordingly, as depicted in FIG. 1, in some examples, image capture device 112 may send image data over network 104 to one or more processors 102 for image processing. In other examples, image capture device 112 may comprise one or more processors and/or a memory effective to perform the various image processing techniques described herein. Network 104 may be, for example, the internet, an intranet, a wide area network, a local area network, or the like. In some examples, image capture device 112 and/or processor device 102 may be effective to send and receive data over network 104.

Image capture device 112 may include, for example, a digital camera module. The digital camera module may comprise any suitable type of image sensor device or devices, such as a charge coupled device (CCD) and/or a complementary metal-oxide semiconductor (CMOS) sensor effective to capture image data from a local environment of image capture device 112. For example, image capture device 112 may include one or more lenses and may be positioned so as to capture images of a portion of the environment disposed along an optical axis (e.g., a light path) of image capture device 112. Image capture device 112 may be a dual mode camera device effective to operate in a day mode and a night mode. During day mode operation (sometimes referred to as "RGB mode" operation), an IR cut filter 161 may be interposed in the light path of image capture device 112. For example, during day mode operation, one or more processors 102 of image capture device 112 may control mechanical positioning of the IR cut filter 161. The IR cut filter 161 may be mechanically interposed between a lens of image capture device 112 and an image sensor of image capture device 112. The IR cut filter 161 may be effective to filter out infrared wavelength light in the infrared spectrum frequency/wavelength range (e.g., from about 700 nm to about 1000 nm) such that light in the infrared portion of the electromagnetic spectrum does not reach an image sensor of image capture device 112. While in day mode, an image signal processor (ISP) of the image capture device 112 may adjust various parameters of the image capture device 112 in order to optimize image quality for image data captured in day mode. For example, the frame rate of a video capture mode of image capture device 112 may be increased when switching from night mode to day mode. In various further examples, while in day mode, an ISP of image capture device 112 may determine, from the signal level of an input frame of image data, if there is sufficient light to produce a default level of image quality. In some examples, image capture device 112 may increase the gain and/or frame rate to increase image quality. In some further examples, various other parameters of image capture device 112 (and/or of an ISP of image capture device 112) may be tuned for day mode. For example, lens shading tables and color uniformity parameters may be optimized for day mode operation. In some examples, in day mode, if the integration time and gain are at maximum values, and the amount of light in a frame of image data is still insufficient to produce an acceptable level of image quality, the image capture device 112 may switch from day mode to night mode.

Processes 180 and 190 describe various operations that may be performed by image capture device 112 and/or by one or more processors 102 configured to be in communication with image capture device 112. Process 180 may represent a day mode process for image capture device 112. In at least some examples, when operating in day mode, image capture device 112 may detect light using RGB channel 116. RGB channel 116 may be used to detect visible wavelength light in the visible portion of the electromagnetic spectrum (e.g., wavelengths from about 390 nm to about 700 nm). Although referred to herein as a single channel, RGB channel 116 may comprise multiple channels. For example, RGB channel 116 may comprise separate channels for red, green and blue. RGB channel 116 may be used to process image data in the visible portion of the electromagnetic spectrum.

Conversely, process 190 may represent a night mode process for image capture device 112. During night mode operation (e.g., IR mode), the IR cut filter 161 may be removed from the light path of image capture device 112. For example, during night mode operation, the IR cut filter 161 may be mechanically removed from a position that is between a lens of image capture device 112 and an image sensor of image capture device 112. Accordingly, image capture device 112 may detect infrared wavelength light in the infrared portion of the spectrum as well as other portions of the electromagnetic spectrum. However, in at least some examples, when operating in night mode, image capture device 112 may detect light using IR channel 118. IR channel 118 may be used to detect light in the infrared portion of the electromagnetic spectrum (e.g., wavelengths from about 700 nm to about 1000 nm). While in night mode, an image signal processor (ISP) of the image capture device 112 may adjust various parameters of the image capture device 112 in order to optimize image quality for image data captured in night mode. For example, in night mode operation, the frame rate of a video capture operation of image capture device 112 may be reduced. In some other examples, an ISP of image capture device 112 may calculate the gain and the frame rate based on the IR light level.

Additionally, image capture device 112 may optionally comprise an infrared light source 182 effective to emit infrared light. In some other examples, image capture device 112 may be configured in communication with an external infrared light source 182. In various examples, image capture device 112 may cause optional infrared light source 182 to emit infrared light when image capture device 112 operates in night mode. Similarly, in various examples, when image capture device 112 is operated in day mode, infrared light emission by infrared light source 182 may be discontinued.

Processor 102 of system 100 may be effective to determine ambient light values based on statistics associated with frames of image data captured by image capture device 112. In various examples, system 100 may not include a dedicated hardware-based ambient light sensor. Accordingly, memory 103 may store instructions that when executed by processor 102 may be effective to determine an estimated ambient light value 120 for RGB channel 116 when image capture device is operated in day mode. Similarly, memory 103 may store instructions that when executed by processor 102 may be effective to determine an estimated ambient light value 140 for IR channel 118 when image capture device is operated in night mode. Additionally, in examples where system 100 does include a dedicated hardware-based ambient light sensor, processor 102 may be effective to improve the accuracy of ambient light values detected by a hardware-based light sensor by correcting for infrared reflectivity of various materials in the environment, as described in further detail below. However, a dedicated hardware-based ambient light sensor may not be as accurate as the ISP-implemented techniques described herein. For example, the field of view of a hardware-based ambient light sensor may not match the field-of-view of the image sensor of image capture device 112; accordingly, the values detected by the hardware-based ambient light sensor may not be optimized for the particular field-of-view of the image sensor of image capture device 112. Additionally, in some further examples, image capture device 112 may allow approximately 3% of pixels to saturate. Traditional hardware-based ambient light sensors, by contrast, are over-angle integrated devices and do not include a mechanism for allowing a small, isolated light region to saturate.

In various examples, processor 102 or another electronic device may determine whether to operate image capture device 112 in day mode or night mode based on a determined ambient light value. For example, if processor 102 determines that ambient light value 120 calculated during day mode for RGB channel 116 is below an predetermined threshold ambient light value, processor 102 may send instructions to image capture device 112 instructing image capture device 112 to switch from day mode to night mode (e.g., IR mode). Accordingly, as depicted in FIG. 1, processor 102 may perform an action 130 in which a camera mode is selected by comparison of ambient light value 120 to a predetermined ambient light threshold value. Similarly, in IR Channel 118 (e.g., during operation of image capture device 112 in night mode) processor 102 may determine an updated ambient light value 160, as described in further detail below. At action 170, processor 102 may select between day mode and night mode operation based on the updated ambient light value 160. For example, if the updated ambient light value 160 is above the predetermined ambient light threshold value, processor 102 may send instructions to image capture device 112 instructing image capture device 112 to switch from night mode to day mode. Conversely, if the updated ambient light value 160 is below the predetermined ambient light threshold value, processor 102 may determine that image capture device 112 should remain in night mode. The updated ambient light value 160 may be calculated based on the various processing techniques described herein.

In at least some examples, a tolerance level (e.g., 5%, 7%, 10%, 15%, 15.3%, etc.) may be used to create a hysteresis to prevent image capture device 112 from rapidly oscillating between day mode and night mode whenever ambient light values 120, 140 cross the predetermined ambient light threshold value. For example, if the tolerance level is 5%, the updated ambient light value 160 calculated in IR channel 118 may be required to exceed the predetermined ambient light threshold value by at least 5% before processor 102 instructs image capture device 112 to switch from night mode to day mode. Similarly, if the tolerance level is 8%, the ambient light value 120 calculated in RGB channel 116 may be required to be less than the predetermined ambient light threshold value by at least 8% before processor 102 instructs image capture device 112 to switch from day mode to night mode. In some examples, the tolerance level may be programmable, while in other examples the tolerance level may be preset and/or predetermined according to a particular design of image capture device 112.

As previously described, in day mode, the IR cut filter 161 may be interposed in the light path of image capture device 112. As such, infrared light may be blocked from reaching an image sensor of image capture device 112. Accordingly, during process 180, ambient light value 120 may be estimated by processor 102 using a histogram generated by image capture device 112 for a particular RGB frame 106 of color image data. In various examples, a histogram may include a luminance histogram and/or a chrominance histogram indicating the relative quantity of light in the RGB frame 106 for various discreet luminance and/or chrominance values (e.g., for 256 luminance and/or chrominance values in an 8-bit sampling scenario). Processor 102 may be effective to determine ambient light value 120 from the luminance and/or chrominance histograms provided by image capture device 112. The signal depicted in the histogram is proportional to the lux level at each point in the field-of-view with frame rate and relative illumination corrections applied.

Ambient light value 120 determined from RGB channel 116 may represent an accurate representation of overall illumination in the scene captured in RGB frame 106 because RGB frame 106 may comprise all light components, frequencies and energies of the scene being captured, and thus RGB frame 106 may be a true representation of the actual ambient light levels. Accordingly, it may be determined with high confidence that image capture device 112 should be switched from day mode to night mode when ambient light value 120 is less than the predetermined light threshold value (and/or less than the predetermined light threshold value and the tolerance band). However, when image capture device 112 is operated in night mode, the IR channel 118 is read by processor 102 and/or image capture device 112.

Figure 4:
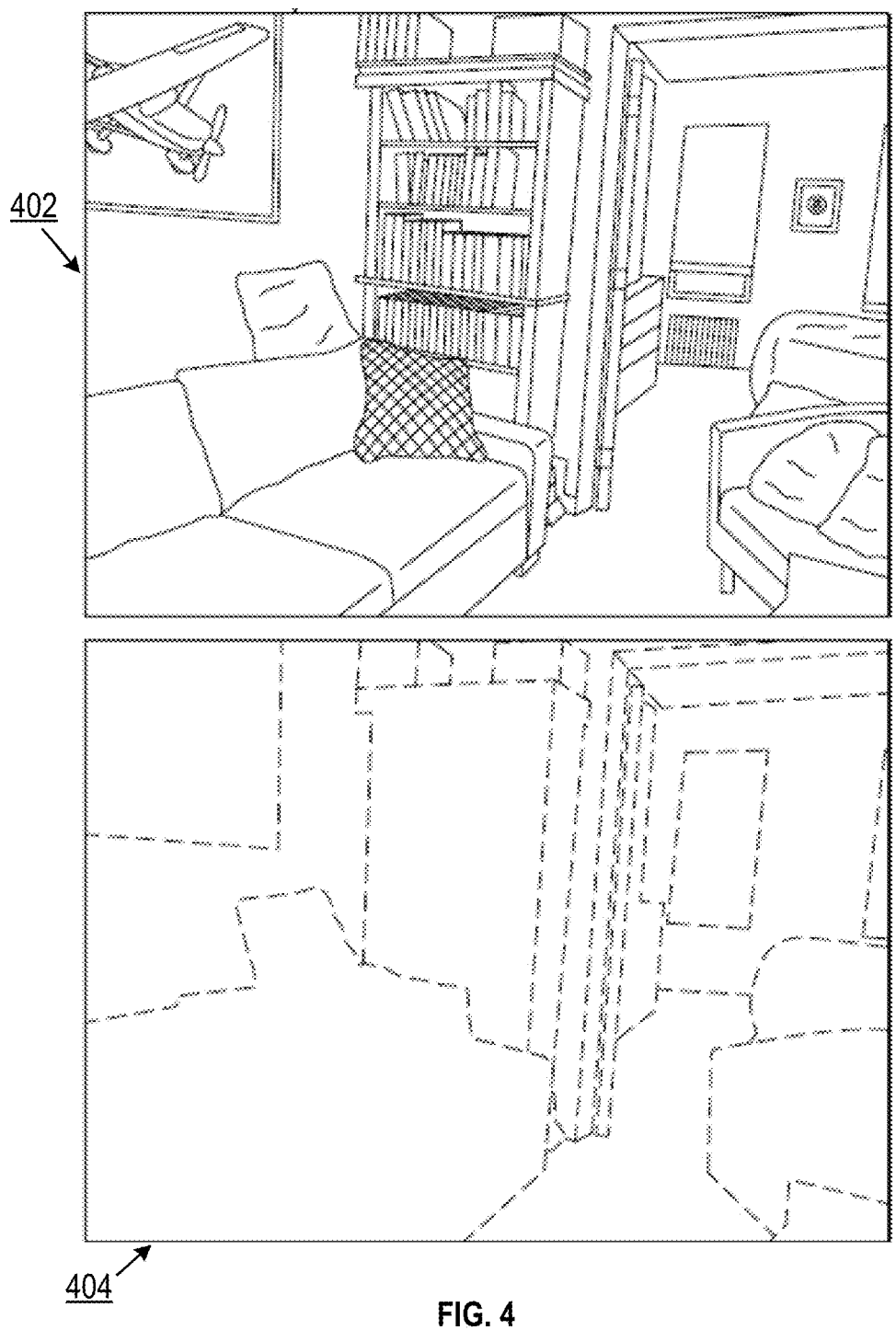
FIG. 4 depicts an example of scene segmentation performed on a frame of image data, in accordance with an aspect of the present disclosure.

Additionally, different materials in a scene captured by image capture device 112 may have different infrared reflectivity properties and thus reflect different amounts of infrared light. Further, a particular material may exhibit different reflectivities when exposed to visible light as compared to infrared light and/or light of other wavelengths. Processor 102 may be effective to perform scene segmentation at action 122. FIG. 4 depicts an example of semantic scene segmentation performed on a frame of image data. Scene segmentation may comprise segmenting IR frame 108 into various groupings of contiguous pixels representing materials and/or objects in the scene represented by IR frame 108. In various examples, each different material and/or object in the scene represented by IR frame 108 may exhibit a surface characteristic. For example, the surfaces of different materials and/or objects may exhibit different IR reflectivity properties and different visible light reflectivity properties. Additionally, the different materials and/or objects may have different textures and/or shapes. In an example, semantic segmentation of a scene may be achieved by processor 102 using a deep learning approach using a VGG class network, as described in *Predicting Depth, Surface Normals and Semantic Labels with a Common Multi-Scale Convolutional Architecture*, David Eigen, Rob Fergus; The IEEE International Conference on Computer Vision (ICCV), 2015, pp. 2650-2658. In FIG. 4, frame 402 comprises image data representing a scene of a room including a hanging picture, a couch, a floor, etc. In various examples, after performing semantic scene segmentation, each different material represented in the scene may be labeled with a semantic label (e.g., "floor", "blue latex wall paint", "purple fabric chair", etc.). Frame 404 represents the same scene after semantic scene segmentation. Pixels representing the same materials and/or pixels with the same or similar surface characteristics in the scene are grouped together into the semantic regions depicted in frame 404. As shown, pixels representing the sofa, book-shelf, picture, floor, etc. of frame 402 are grouped together into respective regions of image data in frame 404.

In various examples, image capture device 112 may be kept in a stationary position over a period of time. In such examples, image capture device 112 may store data related to the scene in memory 103. For example, image capture device 112 may store color values of various static materials in scene. Static materials may be those materials that do not typically change over a given period of time (e.g., the floor, wall, ceiling, and/or furniture of a room represented in frames of image data captured by image capture device 112). Accordingly, pre-stored color values may be used for various materials when operating in night mode as image capture device 112 may have limited capacity to detect visible spectrum light during night mode operation due to low ambient light levels and/or due to using the infrared channel of the image capture device.

Accordingly, at action 122 of process 190 in FIG. 1, processor 102 may semantically segment IR frame 108 into a plurality of different semantic regions representing different materials in the scene with various different materials exhibiting different surface characteristics (such as IR reflectivity properties). For example, a first region of IR frame 108 may represent a piece of furniture with first IR reflectivity properties while a second region of IR frame 108 may represent a painted wall with second IR reflectivity properties. Each region may be associated with an average IR reflectivity value representing the average reflectivity value of pixels of that region. Processor 102 may store a reflectivity table 124 (sometimes referred to herein as an "IR reflectivity lookup table") in memory 103. The reflectivity table 124 may comprise a lookup table or other data structure with entries that associate various physical materials with their respective IR reflectivity values (e.g., estimated IR reflectivities associated with surface characteristics of physical materials). In various examples, reflectivity table 124 may be prepopulated and/or preprogrammed with common materials. Additionally, processor 102 may be effective to update entries of reflectivity table 124 over time with new reflectivity data related to new materials found in-scene and related to new lighting conditions. An IR reflection coefficient (sometimes referred to as an "IR reflectivity coefficient") may be associated with each material in reflectivity table 124. In some examples, a change in IR reflectivity of a particular material may be detected due to a change in lighting conditions. In the example, a value of the IR reflectivity coefficient may be updated due to the change in the IR reflectivity of the particular material. In examples where the IR reflectivity values stored in reflectivity table 124 are average IR reflectivity values, the IR reflection coefficients may likewise be average IR reflection coefficients representing an average of IR reflection coefficients for the material under a variety of different lighting conditions.

In an example, latex paint may be associated with a first IR reflectivity value and a first IR reflection coefficient while glass may be associated with a second IR reflectivity value and a second IR reflection coefficient. In various examples, the IR reflectivities stored in reflectivity table 124 may be the average IR reflectivities for a particular material when exposed to a variety of different lighting conditions. For example, latex paint may exhibit a first average reflectivity when exposed to incandescent light and a second IR reflectivity when exposed to LED light. Accordingly, the IR reflectivity value for latex paint stored in reflectivity table 124 may represent an average IR reflectivity value for latex paint under various lighting conditions (including, for example, incandescent light and LED light). Similarly, when the IR reflectivity value stored in reflectivity table 124 for a particular material is an average IR reflectivity value, the IR reflection coefficient may likewise represent an average IR reflection coefficient for the material under different lighting conditions. In at least some examples, RGB reflectivities (e.g., reflectivity values for materials exposed to light in the visible spectrum) may also be stored in reflectivity table 124.

Processor 102 may determine an IR reflection coefficient for each segmented region of the semantically segmented IR frame 108 by determining the IR reflection coefficient stored in reflectivity table 124 that is associated with each material and/or each physical characteristic of a region of the semantically segmented IR frame 108. Accordingly, processor 102 may associate the IR reflection coefficient with the particular region of segmented IR frame 108. The particular region of segmented IR frame 108 may be represented by a ratio of the number of pixels in the particular region to the total number of pixels in segmented IR frame 108. Processor 102 may thus determine an IR reflection coefficient for each segmented region of IR frame 108. In various examples, if a particular material or physical characteristic of a region of the semantically segmented IR frame 108 does not correspond to a material or physical characteristic stored in reflectivity table 124, the region may be disregarded for purposes of determining an IR RGB_correction value for the IR frame 108. In various other examples, a material and/or physical characteristic of a region that does not match any entries in reflectivity table 124 (e.g., a "non-matching region") may be matched to the material in reflectivity table 124 that most closely corresponds to the non-matching region. For example, a non-matching region may be matched to a material in the reflectivity table 124 with an IR reflectivity value that most closely corresponds to the IR reflectivity value of the material of the non-matching region.

At action 150 of process 190, processor 102 may be effective to determine an IR RGB correction coefficient for each region of segmented IR frame 108. For example, processor 102 may use equation (1) to calculate an IR RGB correction coefficient for ambient light value 140:

$$IR\ \text{RGB\_correction} = \sum_{i \in \text{all regions}} \frac{\text{reflection coeff}[i] * \#\text{pixels}[i]}{\text{total pixels}} \quad (1)$$

IR RGB_correction may represent the combined IR RGB correction factor (e.g., sometimes referred to herein as a "combined IR correction value") for each region of semantically segmented IR frame 108. Processor 102 may multiply the IR RGB_correction by ambient light value 140 to determine updated ambient light value 160. At action 170, processor 102 may select a camera mode based on the updated ambient light value 160. For example, if the updated ambient light value 160 is above the predetermined ambient light threshold value, processor 102 may send instructions to image capture device 112 instructing image capture device 112 to switch from night mode to day mode. In some examples, in response to a determination that image capture device 112 should switch from night mode to day mode, processor 102 may control actuation of IR cut filter 161 to interpose IR cut filter 161 between a lens of image capture device 112 and an image sensor of image capture device 112.

In various examples, image capture device 112 may be configured to continuously capture video. In such examples, processes 180, 190 may be performed at various intervals to determine ambient light value 120 (when in day mode) and updated ambient light value 160 (when in night mode). In order to optimize power consumption and computing resources scene segmentation operation 122 may be performed relatively infrequently (e.g., once every 15 minutes, 5 minutes, 3 minutes, 30 minutes, 2 hours, 3 hours, etc.). Additionally, as described previously, in various examples, processes 180 and/or 190 may be performed by one or more processors accessible over network 104 rather than being performed locally by a processor and/or by image capture device 112. Similarly, in some other examples, portions of processes 180 and/or 190 may be performed locally while other portions of processes 180, 190 may be performed by one or more remote processors.

The determination of the light level with the IR cut filter 161 removed from the optical path of image capture device 112 may be accomplished if the active IR signals from an included infrared light source 182 is already known, or by dimming or turning off the light from infrared light source 182 to estimate the light level without the contribution of IR light from infrared light source 182. For example, emission of infrared light by infrared light source 182 may be reduced, discontinued, and/or dimmed to a predetermined level or set point (e.g., 50%, 33%, etc.) prior to performing process 190. In some examples, the emission of infrared light may be reduced, discontinued, and/or dimmed when no motion is detected in-scene in order to improve the quality of the ambient light estimation. Additionally, in examples where an IR source 182 is included in system 100, IR sweeps may be performed to update reflectivity values of various materials in scene. The ISP of image capture device 112 may determine reflectivity values associated with different materials detected during the IR sweeps. Additionally, reflectivity values stored in reflectivity table 124 may be updated based on the results of the IR sweeps. The ISP of image capture device 112 may also be effective to detect IR leakage based on the IR sweeps.

In various examples, a weighting factor may be used to refine process 190 described above. The weighting factor may depend on the reflectivity of different materials. For example, white wall paint may have an IR RGB correction factor of ~1 regardless of the ambient lighting conditions to which the white wall paint is exposed. By contrast, a purple suede sofa may have an IR RGB correction factor of 1× or 4× depending on the lighting used (e.g., LED lighting vs. incandescent lighting). In the foregoing example, white wall paint may be weighted higher relative to the purple suede material. In the example, white wall paint may be weighted with a weighting factor close to 1, while the purple suede may be weighted with a weighting factor close to 0.5.

Various materials may absorb infrared light. Such materials may be highly weighted to provide an accurate representation of the amount of light on the scene. Weighting factors may be used to weight each material i in equation (1) above. In at least some examples, the weight factors (sometimes referred to herein as "weight values") may be inversely proportional to a variance of IR reflectivities of the particular material under different lighting conditions. The weight factors may be multiplied by the IR RGB_correction for the particular material i to modify the weight of the correction factor for the material i. In some examples, weight factors for different materials may be stored in reflectivity table 124. In some examples, the weight factors may be effective to emulate the full range of reflected light that would be reflected from a material during daytime conditions.

Figure 2:
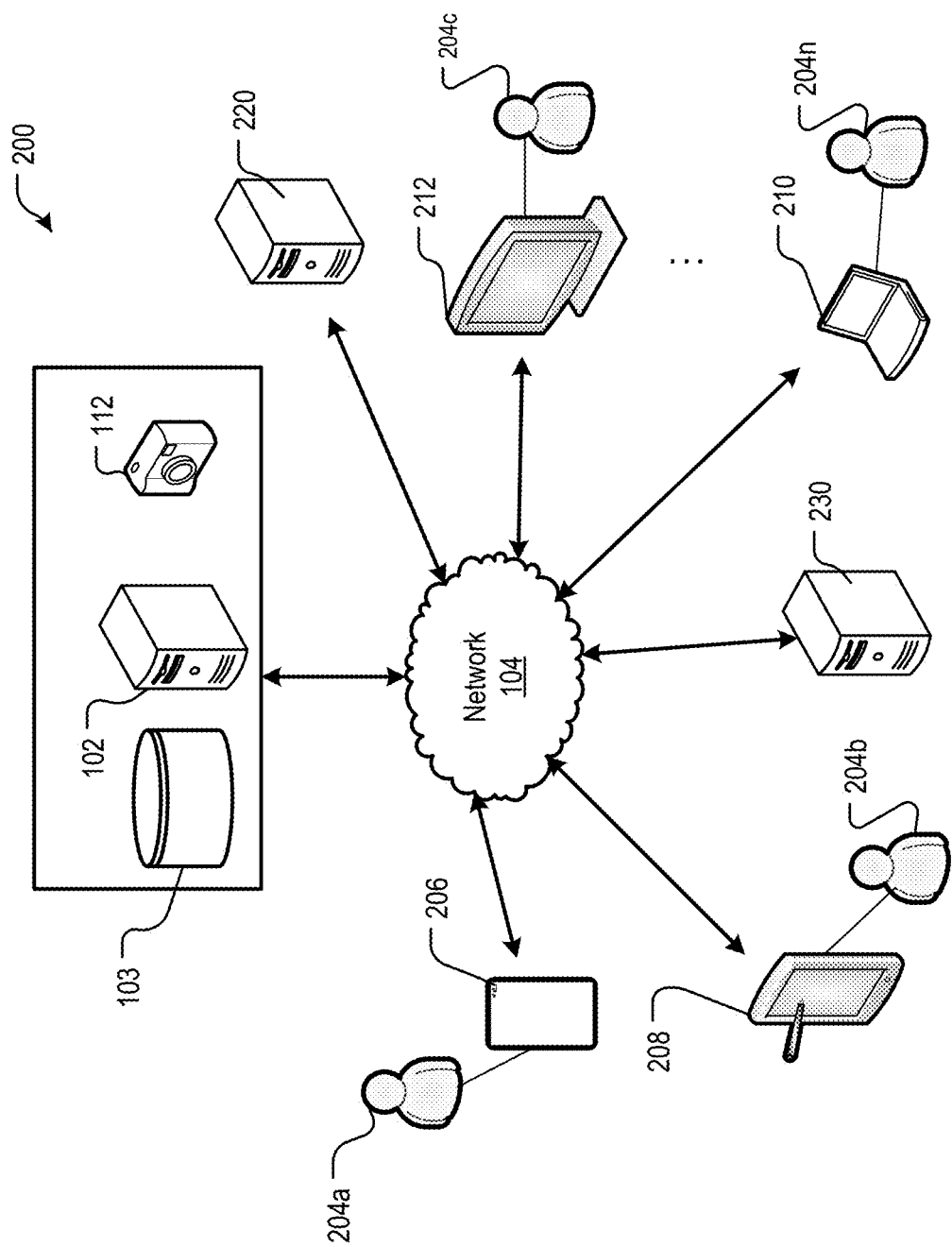
FIG. 2 is a diagram showing an example environment with which the system depicted in FIG. 1 may be used, in accordance with various aspects of the present disclosure.

FIG. 2 is a diagram showing one example of an environment 200 with which the system 100 depicted in FIG. 1 may be used, in accordance with various aspects of the present disclosure. In the example shown in FIG. 2, the one or more processors 102, the memory 103 and the image capture device 112 described with reference to FIG. 1 are located in the same housing. However, as previously described, in various other examples, some combination of processor 102, memory 103 and/or image capture device 112 may be located in separate housings and may be configured to be in communication with one another.

The environment 200 comprises one or more processors 102 (sometimes referred to herein as "processor 102", for brevity), image capture device 112 and users 204a, 204b, 204c, 204n. Each user 204a, 204b, 204c, and 204n may use one or more user devices such as, for example, mobile device 206, tablet computer 208, laptop computer 210, and/or display device 212. Although four users 204a, 204b, 204c, 204n are shown, any suitable number of users may be part of the environment 200. Also, although each user 204a, 204b, 204c, 204n shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

Processor 102 and/or image capture device 112 may perform the various utilities described herein including, for example, processes 180 and/or 190 (depicted in FIG. 1). Although not depicted in FIG. 2, image capture device 112 may also comprise one or more infrared light sources (e.g., infrared light source 182 depicted in FIG. 1), and/or one or more image filters, such as IR cut filter 161 (depicted in FIG. 1). In some examples, the memory 103 may store images captured by image capture device 112 or received from the various user devices, as well as instructions for performing processes 180, 190 described in reference to FIG. 1. Memory 103, processor 102 and/or image capture device 112 may be at a common geographic location and/or may be distributed across multiple geographic locations. For example, the processor 102 may be effective to perform processes 180 and/or 190 and may be implemented in whole or in part as a cloud or Software as a Service (SaaS) system. In some examples, the processor 102 may perform the various image processing techniques described herein (including, for example, processes 180, 190) on images received from image capture device 112 and/or from other sources, such as from the multiple different users 204a, 204b, 204c, 204n (e.g., via their associated cameras, computing devices, or other devices). In various other examples, user devices (such as mobile device 206 associated with user 204a, tablet computer 208 associated with user 204b, display device 212 associated with user 204c, and laptop computer 210 associated with user 204n) may include a companion application effective to send instructions to image capture device 112 and/or processor 102 to view image data captured by image capture device 112 and/or to send and receive data to and from image capture device 112. For example, user 204a may execute a companion application on mobile device 206 and may send commands to image capture device 112 and/or processor 102. In various examples, user 204a may use the companion application to capture image data with image capture device 112. In various other examples, user 204a may use the companion application to perform processes 180 and/or 190. In at least some examples, processes 180, 190 may occur automatically and/or periodically without requiring manual user input.

The various components of the environment 200 may be in communication with one another via a network 104. As described previously, the network 104 may be and/or comprise any suitable wired or wireless network configured according to any suitable architecture or protocol. In some examples, the network 104 may comprise the Internet.

User devices, such as mobile device 206, tablet computer 208, display device 212, and laptop computer 210 may be utilized to control image capture device 112 to capture still and/or video images. In at least some examples, image capture device 112 may be used to continuously capture videos (e.g., such as when image capture device 112 is used as part of a home security system and/or home monitoring system). Memory 103 may be effective to store images and/or video captured by image capture device 112. In at least some examples, memory 103 may represent remote data storage accessible by the various user devices depicted in FIG. 2 via a companion application and/or via a web browser. In various examples, user devices may execute a companion application to control operation of image capture device 112.

In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 112, for example, via the network 104. Although user devices are described as mobile device 206, tablet computer 208, display device 212, and/or laptop computer 210, the user devices may be any suitable type of computing device comprising at least one processor and non-transitory computer-readable memory. In some examples, the user devices may be configured to receive image frames and/or videos captured by the image capture device 112. In some examples, the user devices, such as mobile device 206, tablet computer 208, display device 212, and/or laptop computer 210, may be configured to communicate on a cellular or other telephone network.

In various examples, users, such as users 204a, 204b, 204c, 204 may control image capture device 112 using spoken, audible commands. For example, a user 204a may speak a "wake word" that may be a spoken, audible command. A wake word may be, for example, a word or phrase for which a wake word engine of image capture device 112 and/or processor 102 continually listens. A microphone of image capture device 112 and/or processor 102 may detect the spoken wake word and, in response, subsequent audio captured by the microphone will be processed to detect further audible commands and/or the subsequent audio received by the microphone of image capture device 112 and/or processor 102 may be transmitted to a voice recognition server 220. In the example, user 204a may "wake" the image capture device 112 and/or processor 102 to further voice commands using the wake word, and may thereafter speak an audible command for image capture device 112 to take a video or take a picture or to suspend capturing videos. Audio may be transmitted/streamed from image capture device 112 and/or processor 102 over network 104 to voice recognition server 220 in any audio file format, such as mp3, mp4, or the like. Voice recognition server 220 may receive the transmitted or streamed audio. Upon determining that the audio content has reached an endpoint, voice recognition server 220 may analyze the received audio stream and may translate the audio stream into natural language. Voice recognition server 220 may determine whether or not the natural language corresponds to a command. If so, the voice recognition server 220 may send the command over network 104 to image capture device 112 and/or processor 102. For example, a user 204a may speak the command, "Record video" to processor 102 and/or image capture device 112. Processor 102 and/or image capture device 112 may transmit the voice command to voice recognition server 220. Voice recognition server 220 may analyze the audio stream and may translate the audio stream into natural language. Voice recognition server 220 may determine that the natural language "Record video" corresponds to a command effective to instruct processor 102 and/or image capture device 112 to capture video. Voice recognition server 220 may send the command over network 104 to image capture device 112 and/or processor 102. The command may be effective to cause image capture device 112 to record video.

In some embodiments, the microphone for capturing voice commands may be provided on a different device separate from the image capture device 112 and the processor 102. The processing of the voice command and/or transmission of the audio to the voice recognition server 220 may similarly be performed by a device other than the image capture device 112 and the processor 102.

In various examples in which ambient light values are determined, estimated, corrected and/or updated (by for example process 190 described in reference to FIG. 1) cloud service or SaaS environment, such techniques may be performed at computing device 230. Although depicted as different computing devices in FIG. 2, in some examples, computing device 230 and voice recognition server 220 may be implemented in the same housing. Similarly, in various examples, computing device 230 may be implemented in the same housing as processor 102. In yet other examples, computing device 230 may receive image data captured by image capture device 112 via network 104. After performing ambient light calculations in accordance with the various techniques described herein, computing device 230 may send instructions over network 104 to image capture device 112. For example, the instructions may be effective to cause image capture device 112 to switch between night mode and day mode (or vice versa). In some examples, image data captured by image capture device 112 may be sent to a computer vision system (not shown). The computer vision system may be programmed to recognize various features of a subject or subjects depicted in the image data. For example, the computer vision system may be programmed to recognize a face of a subject.

Figure 3:
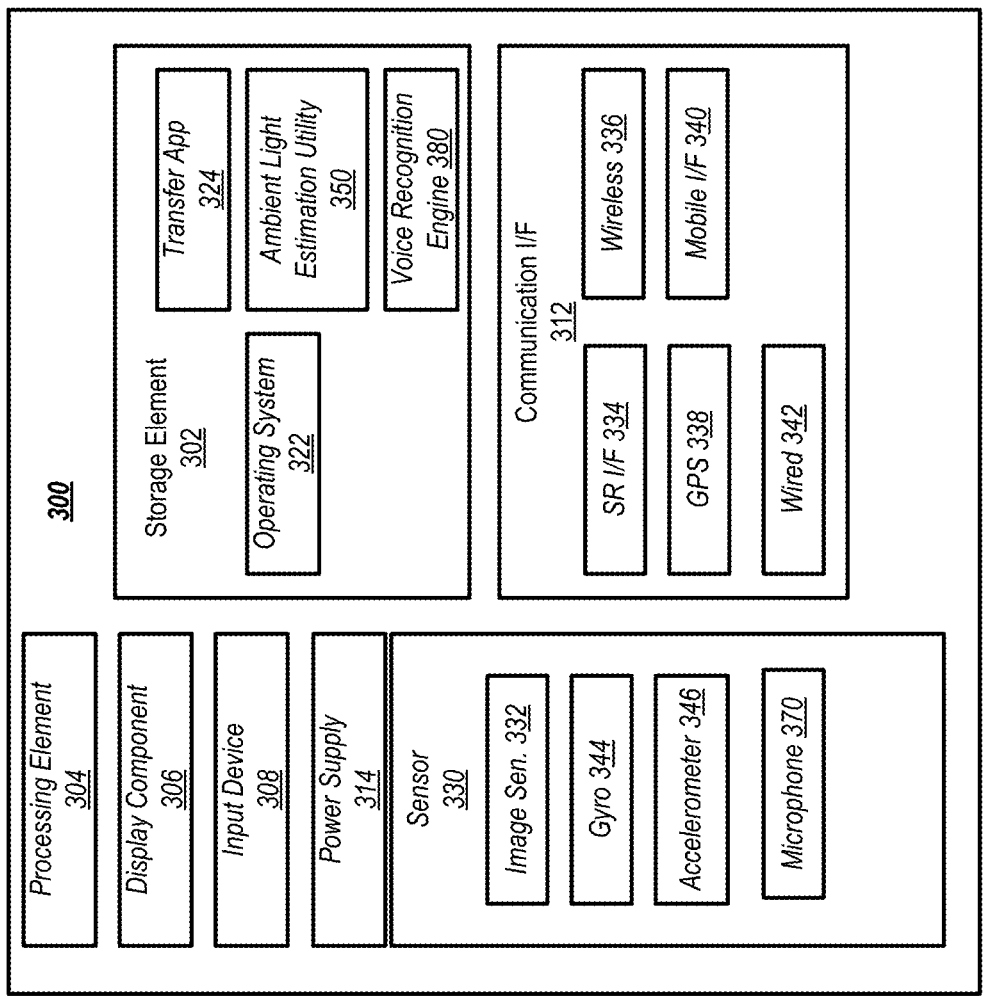
FIG. 3 is a block diagram showing an example architecture of a computing device in which the system described in the present disclosure, or a portion thereof, may be implemented, in accordance with various embodiments described herein.

FIG. 3 is a block diagram showing an example architecture 300 of a user device, such as the image capture devices, processors, mobile devices, and other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs) and/or image signal processors (ISPs). In some examples, the processing element 304 may be effective to filter image data into different frequency bands, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300 (e.g., image capture device 112). In some examples, the transfer application 324 may also be configured to upload the received images to another device that may perform processing as described herein (e.g., a mobile device, another computing device, and/or transformation device 230).

In some examples, storage element 302 may include an ambient light estimation utility 350. The ambient light estimation utility 350 may be configured to determine ambient light values (e.g., ambient light value 120 depicted in FIG. 1) and updated ambient light values (e.g., updated ambient light value 160 depicted in FIG. 1), in accordance with the various techniques described herein.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis, as described above in reference to FIG. 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image capture device 112 (shown in FIG. 1), mobile interface 340 may allow image capture device 112 to communicate with one or more other computing devices such as the various computing devices shown in FIG. 2. For example, image capture device 112 may receive a command from a user device, an application of a user device, or a voice recognition server to capture an image or video. Image capture device 112 may receive a command from the user device to send the captured image or video to the mobile device or to another computing.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be image capture device 112 shown and described in FIG. 1. As described, image capture device 112 may be configured to capture color information, IR image data, image geometry information, and/or ambient light information.

Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 112 (shown in FIG. 1). The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. As described, in some examples, image sensor 332 may be effective to detect infrared light. In at least some examples, architecture 300 may include an infrared light source to illuminate the surrounding environment. In some examples, the processing element 304 may determine the contours of the surface and may be capable of using computer vision techniques to recognize objects and semantically segment image data detected by image sensor 332. In some examples, processing element 304 may build a depth map based on detection by the image sensor 332 of a pattern of structured light displayed on a surface by an infrared projector. In some other examples, image sensor 332 may include a time of flight camera that may compute distance based on the speed of light by measuring the time of flight of a light signal between image sensor 332 and a surface, such as a wall or other object in the scene. Further, in some examples, processing element 304 may be effective to determine the location of various objects in the physical environment within the field of view of image sensor 332 based on the depth map created by the image sensor 332 and/or processing element 304.

FIG. 4 depicts an example of scene segmentation performed on a frame of image data, in accordance with an aspect of the present disclosure.

Scene segmentation may comprise segmenting IR frame 108 into various groupings of contiguous pixels representing materials and/or objects in the scene represented by IR frame 108. In various examples, each different material and/or object in the scene represented by IR frame 108 may exhibit a surface characteristic or other physical characteristic. For example, the different materials and/or objects may exhibit different IR reflectivity properties and different visible light reflectivity properties. Additionally, the different materials and/or objects may have different textures and/or shapes. In an example, semantic scene segmentation may be achieved by processor 102 using a deep learning approach using a VGG class network, as described in *Predicting Depth, Surface Normals and Semantic Labels with a Common Multi-Scale Convolutional Architecture*, David Eigen, Rob Fergus; The IEEE International Conference on Computer Vision (ICCV), 2015, pp. 2650-2658. In FIG. 4, frame 402 comprises image data representing a scene of a room including a hanging picture, a couch, a floor, etc. Frame 404 represents the same scene after semantic scene segmentation. Pixels representing the same materials and/or pixels with the same or similar surface characteristics in the scene are grouped together into the semantic regions depicted in frame 404. As shown, pixels representing the sofa, bookshelf, picture, floor, etc. are grouped together into respective regions in frame 404.

Accordingly, at action 122 of process 190 in FIG. 1, processor 102 may semantically segment IR frame 108 into a plurality of different semantic regions representing different materials in the scene. For example, a first region of IR frame 108 may represent a piece of furniture with first IR reflectivity properties while a second region of IR frame 108 may represent a painted wall with second IR reflectivity properties. Each region may be associated with an average IR reflectivity value representing the average reflectivity value of pixels of that region.

Figure 5:
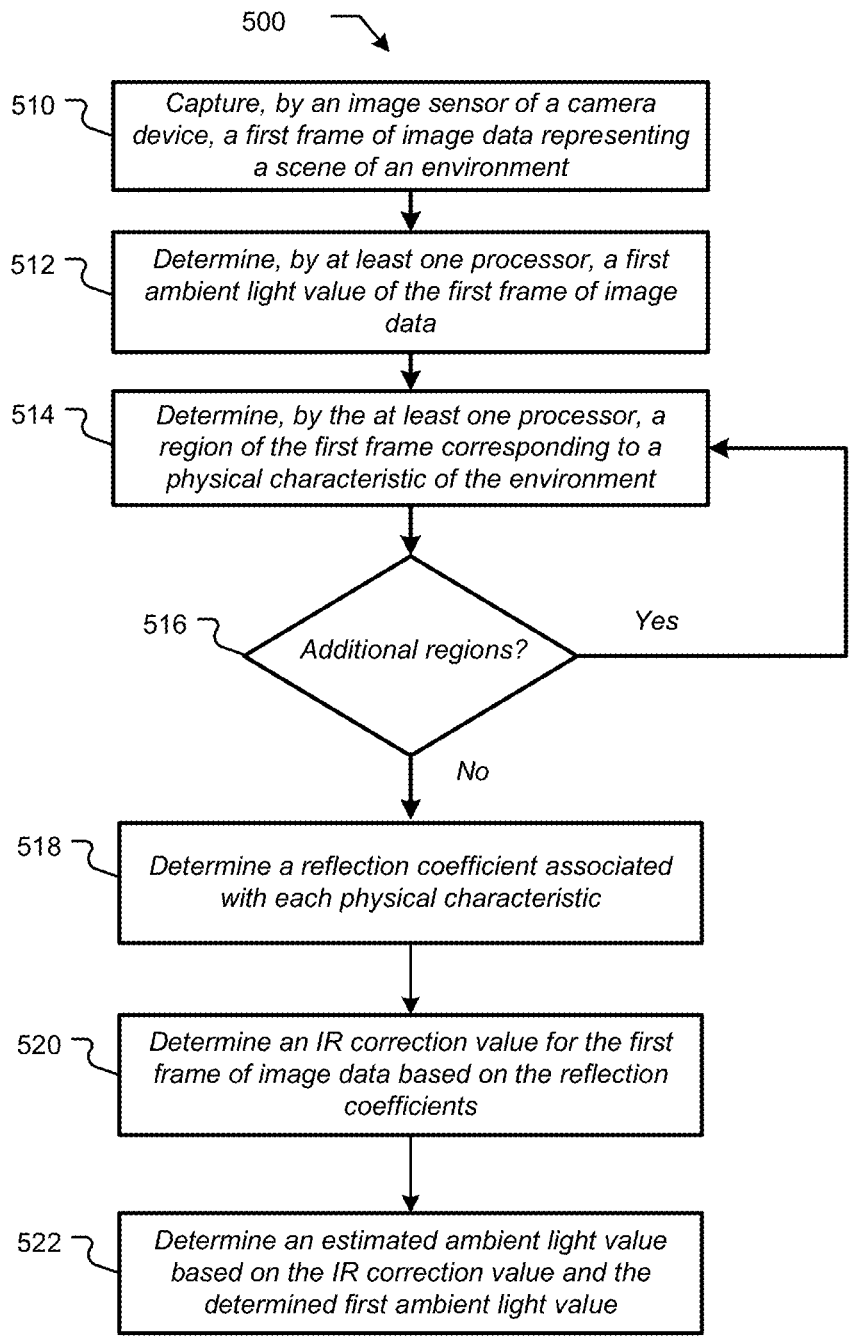
FIG. 5 depicts a flow chart showing an example process for estimating ambient light levels, in accordance with various aspects of the present disclosure.

FIG. 5 is a flow chart showing an example process for estimating ambient light levels, in accordance with various aspects of the present disclosure. The process flow 500 of FIG. 5 may be executed by image capture device 112 and/or by processor 102. The actions of process flow 500 may represent a series of instructions comprising computer-readable machine code executable by a processing unit of a computing device or by an image capture device, such as image capture device 112. In various examples, the computer-readable machine code may be comprised of instructions selected from a native instruction set of the computing device and/or an operating system of the computing device. Various actions in process flow 500 may be described with reference to elements of FIGS. 1-4.

Process flow 500 may begin at action 510, "Capture, by an image sensor of a camera device, a first frame of image data representing a scene of the environment". At action 510, an image sensor, such as image sensor 112 (shown and described above in reference to FIG. 1) may be effective to capture a first frame of image data representing a scene of an environment. As previously described, the first frame of image data may comprise IR image data.

Process flow 500 may continue from action 510 to action 512, "Determine, by at least one processor, a first ambient light value of the first frame of image data." At action 520, at least one processor, such as processor 102 and/or a processor of image capture device 112 may be effective to determine a first ambient light value of the first frame of image data. In various examples, the at least one processor may determine the ambient light value of the first frame using a histogram of the first frame of image data provided by the image capture device 112.

Process flow 500 may continue from action 512 to action 514, "Determine, by the at least one processor, a region of the first frame corresponding to a physical characteristic of the environment". At action 514, the at least one processor may determine a region of the first frame that corresponds to a physical characteristic of the environment. For example, the at least one processor may be effective to perform a semantic scene segmentation as described herein in order to determine various regions of contiguous pixels in the first frame of image data that correspond to various materials, objects, and/or physical characteristics of the environment.

At action 516, the at least one processor may determine whether or not there are additional regions present in the first frame of image data. If additional regions are present, the at least one processor may identify the additional regions within the first frame of image data. When all regions have been identified, processing may continue from action 516 to action 518, "Determine a reflection coefficient associated with each physical characteristic." At action 518, the at least one processor may determine a reflection coefficient associated with each physical characteristic associated with a respective region. For example, the at least one processor may use each physical characteristic as a search input to a lookup table. Entries in the lookup table may associate physical characteristics with reflection coefficients. For example, a flat wall (or other painted surface) covered in blue latex paint may be associated with a first IR reflection coefficient in the lookup table. Accordingly, a region of the first frame of image data associated with the "blue latex paint" physical characteristic may be associated with the corresponding IR reflection coefficient found in the lookup table (e.g., Reflectivity table 124 depicted in FIG. 1).

Processing may continue from action 518 to action 520, "Determine an IR correction value for the first frame of image data based on the reflection coefficients." At action 520, the at least one processor may determine an IR correction value for the first frame of image data based on the reflection coefficients. For example, for each region of the first frame, the at least one processor may multiply the reflection coefficient associated with that region by a ratio of the number of pixels in that region to the total number of pixels in the first frame to determine an IR correction value for each region of the first frame. In at least some examples, the at least one processor may weight the IR correction value for each region according to a variance of the IR reflectivity of the region when subjected to different lighting conditions. Regions comprising materials and/or physical characteristics that exhibit a high IR reflectivity variance under different lighting conditions may be weighted lower relative to materials with relatively little variation in IR reflectivity among different lighting conditions. The at least one processor may determine the sum of IR correction values for each region to determine the IR correction value for the first frame.

Processing may continue from action 520 to action 522, "Determine an estimated ambient light value based on the IR correction value and the determined first ambient light value." At action 522, the at least one processor may determine an estimated ambient light value by multiplying the IR correction value for the first frame by the first ambient light value of the first frame. In various examples, the estimated ambient light value may represent a more accurate ambient light value that takes into account IR reflectivities of various materials in the scene under a variety of different lighting conditions. In at least some examples, the estimated ambient light value may be used to determine whether or not image capture device 112 (depicted in FIG. 1) should switch from a first mode to a second mode. For example, the estimated ambient light value may be used to determine whether or not image capture device 112 should switch from night mode to day mode.

Figure 6:
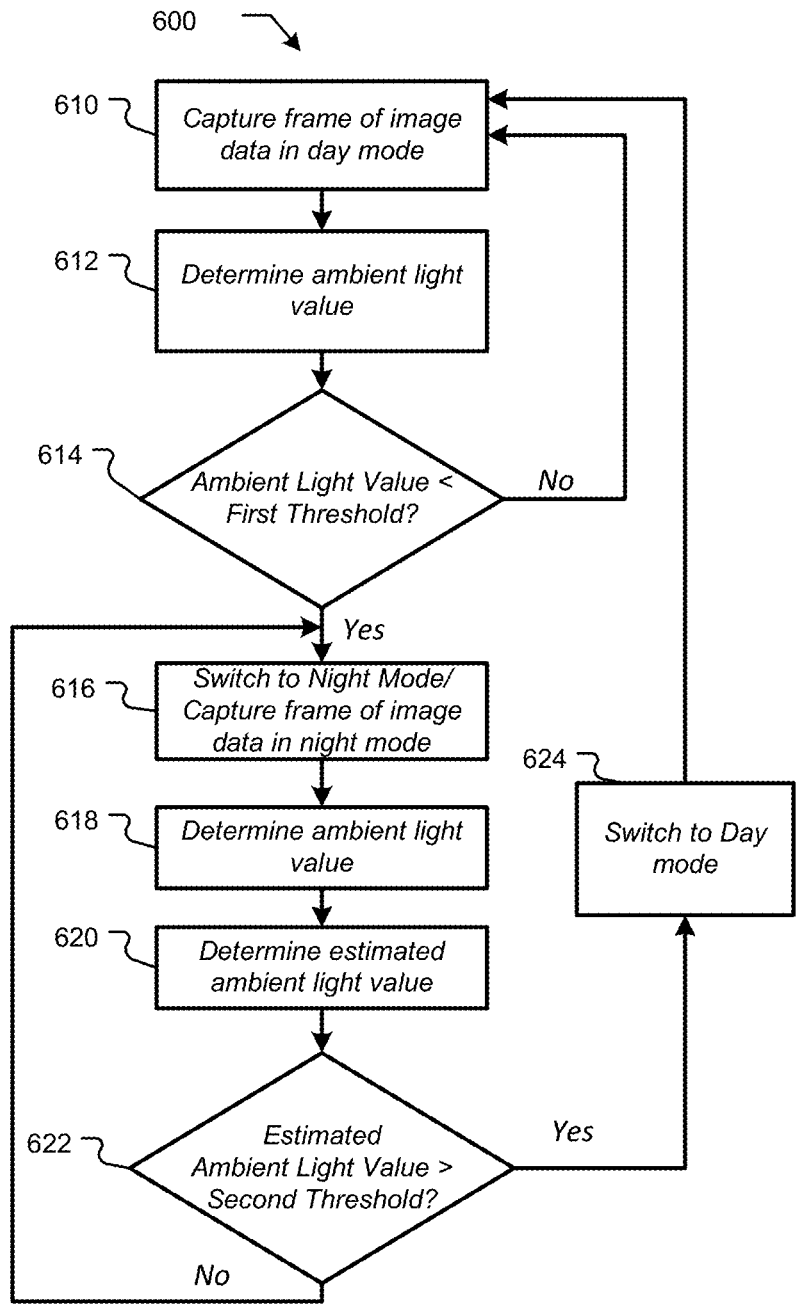
FIG. 6 depicts a flow chart showing an example process for switching between day mode and night mode of an image capture device based on estimation of ambient light levels, in accordance with various aspects of the present disclosure.

FIG. 6 depicts a flow chart showing an example process for switching between day mode and night mode of an image capture device based on estimation of ambient light values, in accordance with various aspects of the present disclosure. The process flow 600 of FIG. 6 may be executed by processor 102 and/or by a combination of processor 102 and image capture device 112, in accordance with various aspects of the present disclosure. The actions of process flow 600 may represent a series of instructions comprising computer-readable machine code executable by processor 102 or by image capture device, such as image capture device 112. In various examples, the computer-readable machine code may be comprised of instructions selected from a native instruction set of the computing device and/or an operating system of the computing device. Various actions in process flow 600 may be described with reference to elements of FIGS. 1-5.

At action 610 of process flow 600, an image capture device, such as image capture device 112 depicted in FIG. 1, may operate in day mode to capture a frame of image data in day mode. Various settings and/or parameters of the image capture device may be optimized for lighting conditions typical of daylight when the image capture device is operated in day mode. Additionally, during day mode operation, an IR cut filter may be interspersed along the optical light path of an image sensor of the image capture device to prevent light from the infrared spectrum from reaching the image sensor.

Process flow 600 may continue from action 610 to action 612, "Determine ambient light value." At action 612, an ambient light value of the frame of image data captured at action 610 may be determined. In an example, the ambient light value of the frame of image data may be determined based on a histogram of intensity values of the frame of image data captured at action 610.

Process flow 600 may continue from action 612 to action 614, at which a determination may be made by processor 102 (FIG. 1) and/or image capture device 112 (FIG. 1) whether or not the ambient light value determined at action 612 is less than a first ambient light threshold. If the ambient light value determined at action 612 is greater than the first threshold, processing may return to action 610, at which another frame of image data may be captured while operating the image capture device in day mode. Conversely, at action 614, if a determination is made that the ambient light value determined at action 612 is less than the first ambient light threshold, processing may proceed to action 616.

At action 616 of process flow 600, the image capture device may be switched from day mode operation to night mode operation. Similar to the description above regarding operation of the image capture device in day mode, in night mode, various settings and/or parameters of the image capture device may be optimized for lighting conditions typical of low light conditions when the image capture device is operated in night mode. Additionally, in at least some examples, when operating the image capture device in night mode, the IR cut filter may be removed from the optical path of the image sensor such that the image sensor my receive infrared light. Similarly, in at least some examples, an infrared light source of the image capture device and/or configured in communication with the image capture device may emit infrared light when the image capture device is operated in night mode in order to illuminate the environment proximate to the infrared light source. Further, at action 616, the image capture device may capture a frame of image data in night mode.

Processing may continue from action 616 to action 618, "Determine ambient light value". At action 618, the image capture device and/or one or more processors configured in communication with the image capture device may determine an ambient light value using, for example, a histogram of the frame of image data captured at action 616. The image capture device and/or one or more processors configured in communication with the image capture device may subsequently determine an estimated ambient light value at action 620. The estimated ambient light value may be determined using, for example, the process flow 500 described above in reference to FIG. 5.

The process flow 600 may continue from action 620 to action 622, at which a determination is made whether or not the estimated ambient light value determined at action 620 exceeds a second ambient light threshold. If the estimated ambient light value determined at action 620 exceeds the second ambient light threshold, processing may continue to action 624, at which the image capture device is switched to day mode. As described previously, when the image capture device is switched to day mode, various settings and/or parameters may be adjusted to optimize the image capture device for operation in daylight conditions. Additionally, the IR cut filter may be positioned within the light path between a lens of the image capture device and the image sensor in order to prevent infrared light from reaching the image sensor. Further, in at least some examples, an IR illumination source may cease emission of infrared light when the image capture device is switched from night mode to day mode.

Processing may continue from action 624 to action 610 wherein a frame of image data is captured by the image capture device during operation of the image capture device in day mode.

If the estimated ambient light value determined at action 620 does not exceed the second ambient light threshold, processing may proceed from action 622 to action 616. At action 616, the image capture device may operate in night mode and may capture a frame of image data in night mode.

Among other potential benefits, a system in accordance with the present disclosure may allow for ambient light estimation without using a dedicated hardware-based ambient light sensor. Additionally, the various techniques described herein may allow for estimation of ambient light levels under various lighting conditions. Further, the various techniques described herein may account for varying IR reflectivities of various materials in-scene. The IR reflectivities of such materials may vary according to the type of illumination present in the scene. The techniques described herein may be effective to correct for the various IR light reflectivities effects on an ambient light level calculated using a histogram of a frame of image data. Accordingly, a system in accordance with the present disclosure may more accurately determine the amount of light in scene and therefore can make a more informed decision regarding whether or not to switch between day and night modes.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of estimating ambient light levels, the method comprising:
    capturing, by an image sensor of a camera device, first image data representing a scene of an environment;
    determining, by at least one processor, a first ambient light value of the first image data;
    determining, by the at least one processor, a first region of the first image data corresponding to a first surface characteristic of at least a first object represented by the first image data, wherein the first region comprises a first plurality of contiguous pixels;
    determining, by the at least one processor, a second region of the first image data corresponding to a second surface characteristic of at least a second object represented by the first image data, wherein the second region comprises a second plurality of contiguous pixels and wherein the second surface characteristic is different from the first surface characteristic;
    determining, by the at least one processor, a first reflection coefficient associated with the first surface characteristic;
    determining, by the at least one processor, a second reflection coefficient associated with the second surface characteristic;
    determining an infrared (IR) correction value for the first image data based at least in part on the first reflection coefficient and the second reflection coefficient; and
    determining an estimated ambient light value for the first image data based at least in part on the IR correction value and the first ambient light value.

2. The method of claim 1, further comprising:
    determining that the estimated ambient light value is greater than an ambient light threshold value;
    controlling, by the at least one processor, a position of an IR cut filter to interpose the IR cut filter in a light path of the camera device along which the first image data is captured; and
    operating the camera device in day mode based at least in part on the estimated ambient light value being greater than the ambient light threshold value.

3. The method of claim 1, wherein the first reflection coefficient is a preprogrammed average infrared reflection coefficient exhibited by a first material of the environment when subjected to a plurality of different lighting conditions.

4. The method of claim 1, further comprising performing a semantic segmentation of the first image data to determine the first region comprising the first plurality of contiguous pixels corresponding to the first surface characteristic in the first image data and to determine the second region comprising the second plurality of contiguous pixels corresponding to the second surface characteristic in the first image data.

5. The method of claim 1, further comprising:
    determining, by the at least one processor, a third region of the first image data corresponding to a third surface characteristic;
    determining that the third surface characteristic does not correspond to any entry in an IR reflectivity lookup table stored in a memory associated with the camera device; and
    disregarding the third region when determining the IR correction value.

6. The method of claim 1, further comprising:
    determining a first weight value for a first material represented by the first region of the first image data, wherein the first weight value is based on a different reflectivity values associated with the first material when the first material is exposed to different lighting conditions;
    determining an updated IR correction value based at least in part on the first weight value;
    determining an updated estimated ambient light value based at least in part on the updated IR correction value;
    determining that the updated estimated ambient light value is greater than an ambient light threshold value;
    controlling, by the at least one processor, a position of an IR cut filter to interpose the IR cut filter in a light path of the camera device along which the first image data is captured; and
    operating the camera device in day mode based at least in part on the updated estimated ambient light value being greater than the ambient light threshold value.

7. The method of claim 1, further comprising:
    calculating a first IR correction value for the first region of the first image data by multiplying the first reflection coefficient by a first ratio of first pixels in the first region to a total number of pixels in the first image data; and
    calculating a second IR correction value for the second region of the first image data by multiplying the second reflection coefficient by a second ratio of second pixels in the second region to the total number of pixels in the first image data, wherein the IR correction value for the first image data comprises a summation of at least the first IR correction value and the second IR correction value.

8. An electronic device comprising:
an image sensor effective to detect visible wavelength light and infrared (IR) wavelength light;
an IR cut filter effective to prevent IR wavelength light from reaching the image sensor when the IR cut filter is placed within a light path of the image sensor;
at least one processor; and
a memory in communication with the at least one processor, the memory effective to store instructions that, when executed by the at least one processor, cause the electronic device to perform a method comprising:
capturing first image data representing a scene of an environment;
determining a first ambient light value of the first image data;
determining a first region of the first image data corresponding to a first surface characteristic of at least a first object represented by the first image data, wherein the first region comprises a first plurality of contiguous pixel values;
determining a second region of the first image data corresponding to a second surface characteristic of at least a second object represented by the first image data, wherein the second region comprises a second plurality of contiguous pixel values;
determining a first reflection coefficient associated with the first surface characteristic;
determining a second reflection coefficient associated with the second surface characteristic;
determining an IR correction value for the first image data based at least in part on the first reflection coefficient and the second reflection coefficient; and
determining an estimated ambient light value for the first image data based at least in part on the IR correction value and the first ambient light value.

9. The electronic device of claim 8, wherein the instructions, when executed by the at least one processor, are effective to cause the electronic device to perform the method further comprising:
determining that the estimated ambient light value is greater than an ambient light threshold value;
controlling, by the at least one processor, a position of the IR cut filter to interpose the IR cut filter in the light path of the image sensor along which the first image data is captured; and
operating the image sensor in day mode based at least in part on the estimated ambient light value being greater than the ambient light threshold value.

10. The electronic device of claim 8, wherein the first reflection coefficient is an average infrared reflection coefficient exhibited by a first material subjected to a plurality of different lighting conditions.

11. The electronic device of claim 8, wherein the instructions, when executed by the at least one processor, are effective to cause the electronic device to perform the method further comprising using semantic segmentation of the first image data to determine the first region comprising the first plurality of contiguous pixels corresponding to the first surface characteristic and to determine the second region comprising the second plurality of contiguous pixels corresponding to the second object.

12. The electronic device of claim 8, wherein the instructions, when executed by the at least one processor, are effective to cause the electronic device to perform the method further comprising:
determining a third region of image data of the first image data corresponding to a third surface characteristic;
determining that the third surface characteristic does not correspond to any entry in an IR reflectivity lookup table stored in the memory; and
disregarding the third region of image data when determining the IR correction value.

13. The electronic device of claim 12, wherein the IR reflectivity lookup table comprises:
a first entry corresponding to a first material, wherein the first entry comprises a first average IR reflectivity value of the first material and the first reflection coefficient; and
a second entry corresponding to a second material, wherein the second entry comprises a second average IR reflectivity value of the second material and the second reflection coefficient.

14. The electronic device of claim 8, wherein the instructions, when executed by the at least one processor, are effective to cause the electronic device to perform the method further comprising:
determining a first weight value for a first material represented by the first region of the first image data, wherein the first weight value is based on different reflectivity values associated with the first material when the first material is exposed to different lighting conditions;
determining an updated IR correction value based at least in part on the first weight value;
determining an updated estimated ambient light value based at least in part on the updated IR correction value;
determining that the updated estimated ambient light value is greater than an ambient light threshold value;
controlling a position of the IR cut filter to interpose the IR cut filter in the light path of the image sensor along which the first image data is captured; and
operating the image sensor in day mode based at least in part on the updated estimated ambient light value being greater than the ambient light threshold value.

15. The electronic device of claim 8, further comprising an infrared light source effective to illuminate the environment, wherein the instructions, when executed by the at least one processor, are effective to cause the electronic device to perform the method further comprising:
illuminating the environment with the infrared light source; and
reducing an amount of light emitted by the infrared light source to a predetermined level prior to capturing the first image data.

16. The electronic device of claim 8, further comprising an infrared light source effective to illuminate the environment, wherein the instructions, when executed by the at least one processor, are effective to cause the electronic device to perform the method further comprising:
determining that the estimated ambient light value is greater than an ambient light threshold value;
controlling, by the at least one processor, a position of the IR cut filter to interpose the IR cut filter in the light path of the image sensor; and
ceasing illumination from the infrared light source.

17. A method of estimating ambient light levels, the method comprising:

capturing, by an image sensor of a camera device, first image data representing a scene of an environment;

determining, by at least one processor, a first ambient light value of the first image data;

determining, by the at least one processor, a first region of the first image data corresponding to a first surface characteristic of at least a first object represented by the first image data, wherein the first region comprises a first plurality of contiguous pixels;

determining, by the at least one processor, a second region of the first image data corresponding to a second surface characteristic of at least a second object represented by the first image data, wherein the second region comprises a second plurality of contiguous pixels and wherein the second surface characteristic is different from the first surface characteristic;

determining, by the at least one processor, a first reflection coefficient associated with the first surface characteristic;

determining, by the at least one processor, a second reflection coefficient associated with the second surface characteristic;

determining a first infrared (IR) correction value for the first region of the first image data by multiplying the first reflection coefficient by a first ratio of a first number of pixels of the first region to a total number of pixels in the first image data;

determining a second IR correction value for the second region of the first image data by multiplying the second reflection coefficient by a second ratio of a second number of pixels of the second region to the total number of pixels in the first image data;

determining an estimated ambient light value for the first image data based at least in part on the first IR correction value, the second IR correction value, and the first ambient light value.

18. The method of claim 17, further comprising:

detecting a change in an IR reflectivity of the second surface characteristic from a first value to a second value due to a change in lighting conditions; and updating a third value of the second reflection coefficient in an IR reflectivity lookup table to reflect the change in the IR reflectivity of the second surface characteristic.

19. The method of claim 18, further comprising:

determining a third IR correction value for the second region by multiplying the third value of the second reflection coefficient by the second ratio of the second number of pixels of the second region to the total number of pixels in the second image data; and determining a combined IR correction value for the first image data by adding at least the first IR correction value and the third IR correction value.

20. The method of claim 17, further comprising:

determining a first IR reflectivity value of the first surface characteristic for a first lighting condition;

determining a second IR reflectivity value of the first surface characteristic for a second lighting condition;

determining a first weight value for the first surface characteristic to modify the first IR correction value, wherein the first weight value is effective to normalize the first IR reflectivity value and the second IR reflectivity value; and multiplying the first IR correction value by the first weight value to generate a third IR correction value.

* * * * *